(12) United States Patent
Minadeo et al.

(10) Patent No.: US 8,338,980 B2
(45) Date of Patent: Dec. 25, 2012

(54) WIND TURBINE WITH SINGLE-STAGE COMPACT DRIVE TRAIN

(75) Inventors: Adam Daniel Minadeo, Greenville, SC (US); James Henry Madge, Simpsonville, SC (US); Priyangu Chunilal Patel, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/280,508

(22) Filed: Oct. 25, 2011

(65) Prior Publication Data
US 2012/0133154 A1    May 31, 2012

(51) Int. Cl.
*F03D 9/00*        (2006.01)
(52) U.S. Cl. .............................. 290/44; 290/55; 290/1 C
(58) Field of Classification Search .................... 290/44, 290/55, 1 C
See application file for complete search history.

(56) References Cited

U.S. PATENT DOCUMENTS

| | | | |
|---|---|---|---|
| 6,790,156 | B2 | 9/2004 | Hosle |
| 7,259,472 | B2 | 8/2007 | Miyake et al. |
| 7,377,750 | B1 * | 5/2008 | Costin et al. .............. 416/146 R |
| 7,538,446 | B2 | 5/2009 | Bonnet |
| 7,815,536 | B2 | 10/2010 | Jansen et al. |
| 7,935,020 | B2 | 5/2011 | Jansen et al. |
| 7,936,080 | B2 * | 5/2011 | Bech et al. ...................... 290/55 |
| 2010/0113210 | A1 | 5/2010 | Lopez et al. |
| 2011/0245031 | A1 * | 10/2011 | Saenz De Ugarte Sevilla et al. ............................. 475/347 |

FOREIGN PATENT DOCUMENTS

| | | |
|---|---|---|
| EP | 0 811 764 A1 | 12/1997 |
| EP | 1 045 139 A2 | 10/2000 |
| EP | 10 045 140 A3 | 10/2000 |

* cited by examiner

*Primary Examiner* — Tho D Ta
(74) *Attorney, Agent, or Firm* — Dority & Manning, P.A.

(57) ABSTRACT

A drive train for a wind turbine includes individual rotor blades connected to a rotor hub. The drive train includes a gearbox, with the rotor hub mounted directly to the gearbox. The gearbox further includes a stationary gear carrier mounted to a mainframe of the wind turbine such that the gearbox substantially supports the weight of the rotor hub. A generator includes a rotor and stationary stator, with the gearbox comprising an output shaft coupled to the rotor such that the gearbox substantially supports the weight of the rotor.

18 Claims, 4 Drawing Sheets

WIND TURBINE WITH SINGLE-STAGE COMPACT DRIVE TRAIN

FIELD OF THE INVENTION

The present subject matter relates generally to a compact drive train. More specifically, the subject matter relates to a compact geared drive train for a wind turbine.

BACKGROUND OF THE INVENTION

Wind turbines are receiving increasingly more attention as an environmentally safe and relatively inexpensive alternative energy sources. Wind turbines do not emit greenhouse gases (GHGs), and therefore, do not contribute to global warming. With the growing interest in wind generated electricity, considerable efforts have been made to develop wind turbines that are reliable and efficient.

Typically, wind turbines are used to convert the kinetic energy in the wind into mechanical power. This mechanical power may be used for specific tasks (such as pumping water) or a generator may convert this mechanical power (i.e., the rotation of a shaft) into electricity. A wind turbine usually includes an aerodynamic mechanism (e.g., blades) for converting the movement of air into a mechanical motion (e.g., rotation), which is then converted with a generator into electrical power. Power output from the generator is proportional to the cube of the wind speed. As wind speed doubles, the capacity of wind generators increases almost eightfold.

The majority of commercially available wind turbines utilize multi-stage geared drive trains to connect the turbine blades to the electrical generators. The wind turns the turbine blades, which spin a low speed shaft. The low speed shaft is coupled to an input shaft of a gearbox, which has a higher speed output shaft connected to a generator. Thus, the geared drive aims to increase the velocity of the mechanical motion.

The majority of geared drive trains in existing wind turbines of ratings >1 MW utilize multiple gear stages to achieve gear ratios ranging from about 1:70 up to about 1:110. The three stages typically comprise a simple planetary or epicylic first stage, followed by two parallel offset stages (bull-gear+ pinion gears) or a second simple planetary stage followed by a parallel offset stage. The high gear ratio enables a generator that is substantially smaller and lower cost than the gearbox. The relatively high-speed of the generator forces the generator to have an aspect ratio that is longer than it is wide, with radial-vented cooling. The high-speed output shaft of the gearbox is generally not concentric with the low-speed input shaft of the gearbox. For these reasons, the generator is mounted separately and spaced from the gearbox on a mainframe (also commonly called a bedframe or bedplate). Power is transferred from the gearbox to the generator via a flexible "high-speed" shaft coupling. This arrangement forces the gearbox and generator to be physically distanced from each other, as well as requires both the output shaft of the gearbox and the input shaft of the generator to be separately supported by gearbox bearings and generator bearings, respectively.

A more optimal configuration of a geared drive train is therefore desirable by the wind industry to provide increased reliability and availability, reduced cost, reduced mass and size, and increased efficiency.

BRIEF DESCRIPTION OF THE INVENTION

Aspects and advantages of the invention will be set forth in part in the following description, or may be obvious from the description, or may be learned through practice of the invention.

In accordance with aspects of the invention, a drive train is provided for a wind turbine, with the wind turbine having individual rotor blades connected to a rotor hub. The drive train includes a gearbox, with the rotor hub mounted directly to the gearbox. The gearbox further includes a stationary gear carrier mounted to a mainframe component of the wind turbine, such as a bedplate or bedframe member, whereby the gearbox substantially supports the weight of the rotor hub. A generator is provided, with the gearbox having an output shaft coupled to the generator rotor such that the gearbox substantially supports the weight of the generator rotor.

In a particular embodiment of the drive train, the gearbox includes an outer slewing bearing having a stationary ring mounted to the gear carrier and a rotating gear ring, with the rotor hub mounted directly to the rotating gear ring. The gearbox in this embodiment may include a planetary gear configuration between the rotating gear ring and the output shaft. For example, the planetary gear configuration may include a plurality of planet gears supported by the gear carrier and rotationally geared to the rotating gear ring. In this embodiment, the gear carrier may define a fixed shaft for each of the planet gears. A rotating sun gear is geared to the planet gears, with the sun gear rotationally driving the output shaft, which may be defined as an axial extension of the sun gear. For example, the output shaft and the sun gear may be formed as a single integral component.

The output shaft may be coupled to the generator rotor by various devices. For example, in one embodiment, a spline hub may be mounted to rotor, with the output shaft coupled to the spline hub. A spline hub bearing may be mounted to the gear carrier concentric to the spline hub.

The present invention also encompasses any configuration of a wind turbine having a drive train as embodied herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
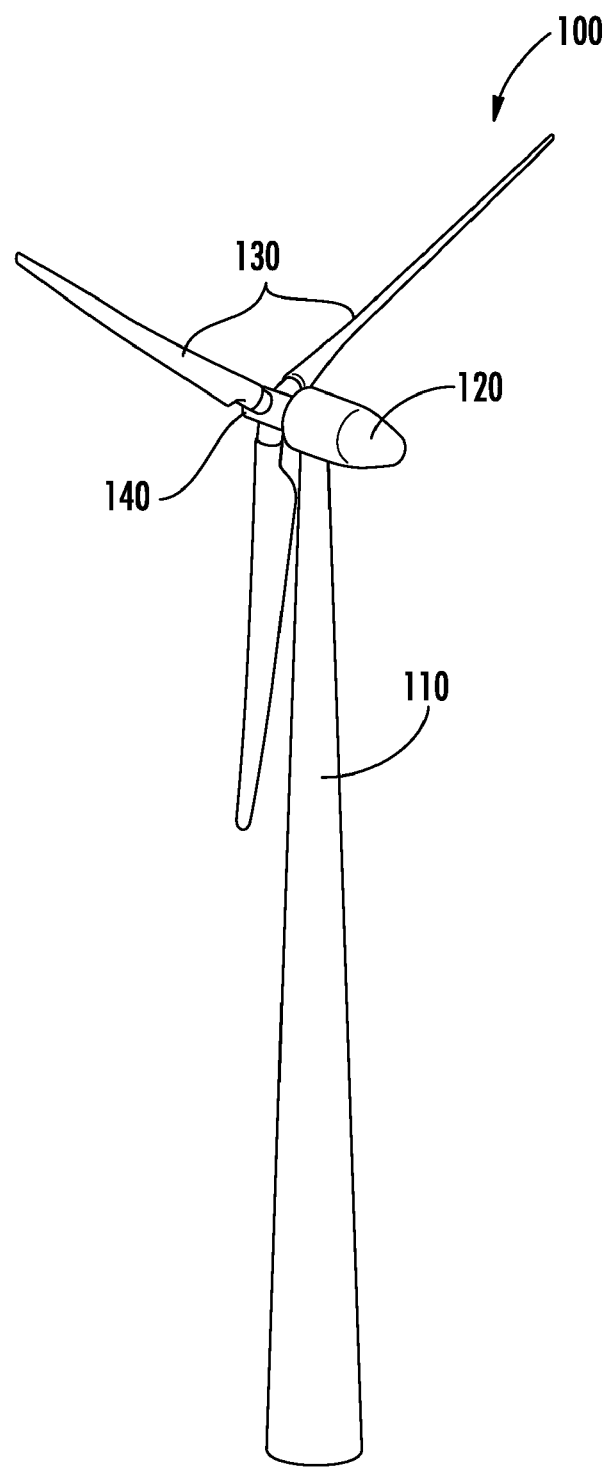
FIG. 1 is a perspective view of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention encompasses such modifications and variations as come within the scope of the appended claims and their equivalents.

Figure 2:
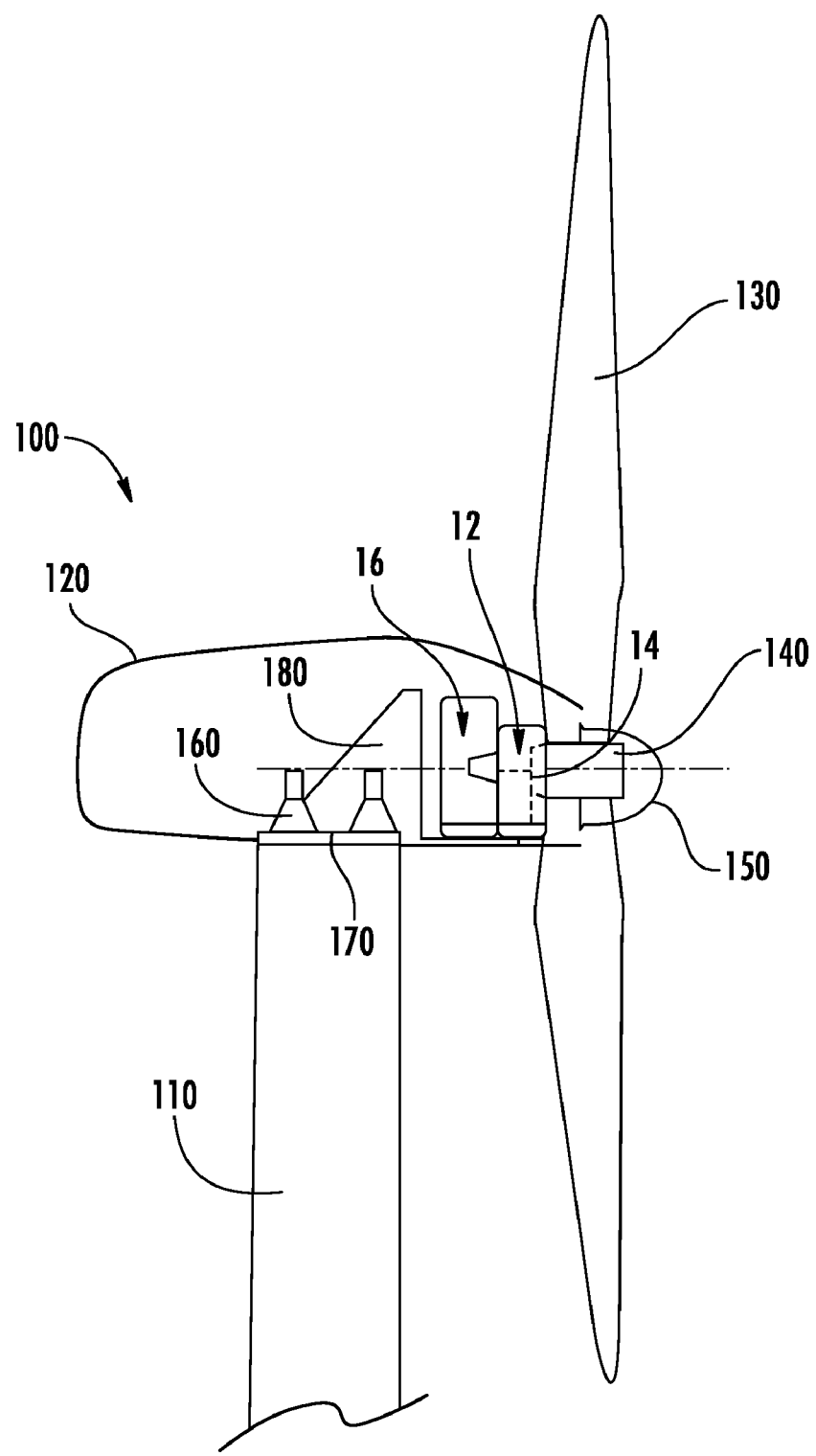
FIG. 2 is a partial perspective view of a wind turbine with a drive train in accordance with aspects of the invention.

A conventional commercial horizontal axis wind turbine (HAWT) 100 is illustrated in FIG. 1. The wind turbine 100 includes a tubular tower 110, which is often manufactured of steel or concrete and may be erected by stacking multiple tower segments on top of each other. The tower 110 supports the weight of the nacelle 120, blades 130 and rotor hub 140. The tower 110 may also be of the lattice (or truss) type. The nacelle 120 typically houses the drive train components (e.g., gearbox, shafts, couplings, generator, etc.), as well as the mainframe 180 (also called a "bedplate" or "bedframe") on which the drive train components are mounted. Referring to FIG. 2, yaw drives 160 may be engaged with a ring gear 170 to rotate the mainframe 180 (and nacelle 120) relative to the tower 110. Other items such as the control electronics may be housed within the nacelle 120 as well. Typically, the nacelle 120 has an outer skin that is comprised of a lightweight material such as fiberglass or graphite composite. The main function of the nacelle skin is to protect the drive train and control components from the elements (e.g., rain, ice, snow, etc.).

The blades 130 are connected to the rotor hub 140, and the hub 140 may contain a pitch control mechanism to control the pitch angle of each blade 130. Typically, three blades 130 are employed in most commercial wind turbines, however, one, two or four or more blades could be employed as well. The blades 130 convert the kinetic energy of the wind into mechanical energy by rotating a low speed shaft. The blades 130 may be manufactured from fiberglass or graphite composites, fiberglass reinforced plastics or wood/epoxy laminates, or other suitable materials. With conventional constructions, the low speed shaft is connected to the hub 140 typically via a bolted flange coupling.

Typically, in turbines greater than 1 MW, the low speed shaft will rotate at a variable speed depending upon the wind speed, from zero up to a maximum steady-state speed being generally the rated speed of the turbine whereby the turbine is producing rated power. The rated rotation speed at the rated power of the turbine is a function of power rating, blade length, wind class, etc. and will vary typically from about 18 to about 22 RPM for a 1.5 MW turbine down to about 14 to about 16.5 RPM for a 2.5 MW turbine. Rated rotation speeds of the low speed shaft can vary above or below these ranges as well.

Generators are used to convert the rotation of a shaft into electrical energy. A gearbox is typically used to increase the speed of the input shaft to the generator. The gearbox has the low speed shaft as its input, and the output is a higher speed shaft, which according to aspects of the present invention, can feed directly into the generator.

FIG. 2 illustrates a wind turbine 100 that incorporates a drive train 10 in accordance with aspects of the present subject matter. The drive train 10 includes a gearbox 12 that is coupled directly to the rotor hub 140, as discussed in greater detail below. The gearbox 12 includes a stationary gear carrier 14 that is mounted to the mainframe 180 within the nacelle 120. Thus, with this configuration, the gearbox 12 substantially supports the weight of the rotor hub 140 by the coupling of the gearbox 12 directly to the mainframe 180 via the stationary gear carrier 14.

Still referring to FIG. 2, a generator 16 is operably coupled to the gearbox 12 via an output shaft from the gearbox 12 that is rotationally coupled to a rotor within the generator 16. With this configuration, the gearbox 12 also substantially supports the weight of the generator rotor.

The drive train 10 embodied in FIG. 2 thus eliminates a main drive shaft between the rotor hub 140 and gearbox 12, as well as associated bearings and couplings. The drive train configuration 10 allows for the use of a smaller, less expensive generator 16 and not only shrinks the entire drive train length, but provides a much lighter wind turbine drive train in general that is capable of producing significant power output. The drive train configuration 10 allows for the use of a smaller torque transmission shaft and smaller generator because the torque from the rotor 140 is reduced by the single-stage gearbox 12, which provides higher reliability and less friction losses when compared to a multi-stage gearbox. In addition, the use of a fixed gear carrier 14 design, as discussed in greater detail below, allows for simplified lubrication of the rotating components. In addition, the main structural support within the nacelle 120, namely the mainframe 180 can be simplified, thereby further reducing the weight and complexity of the drive train components.

Figure 3:
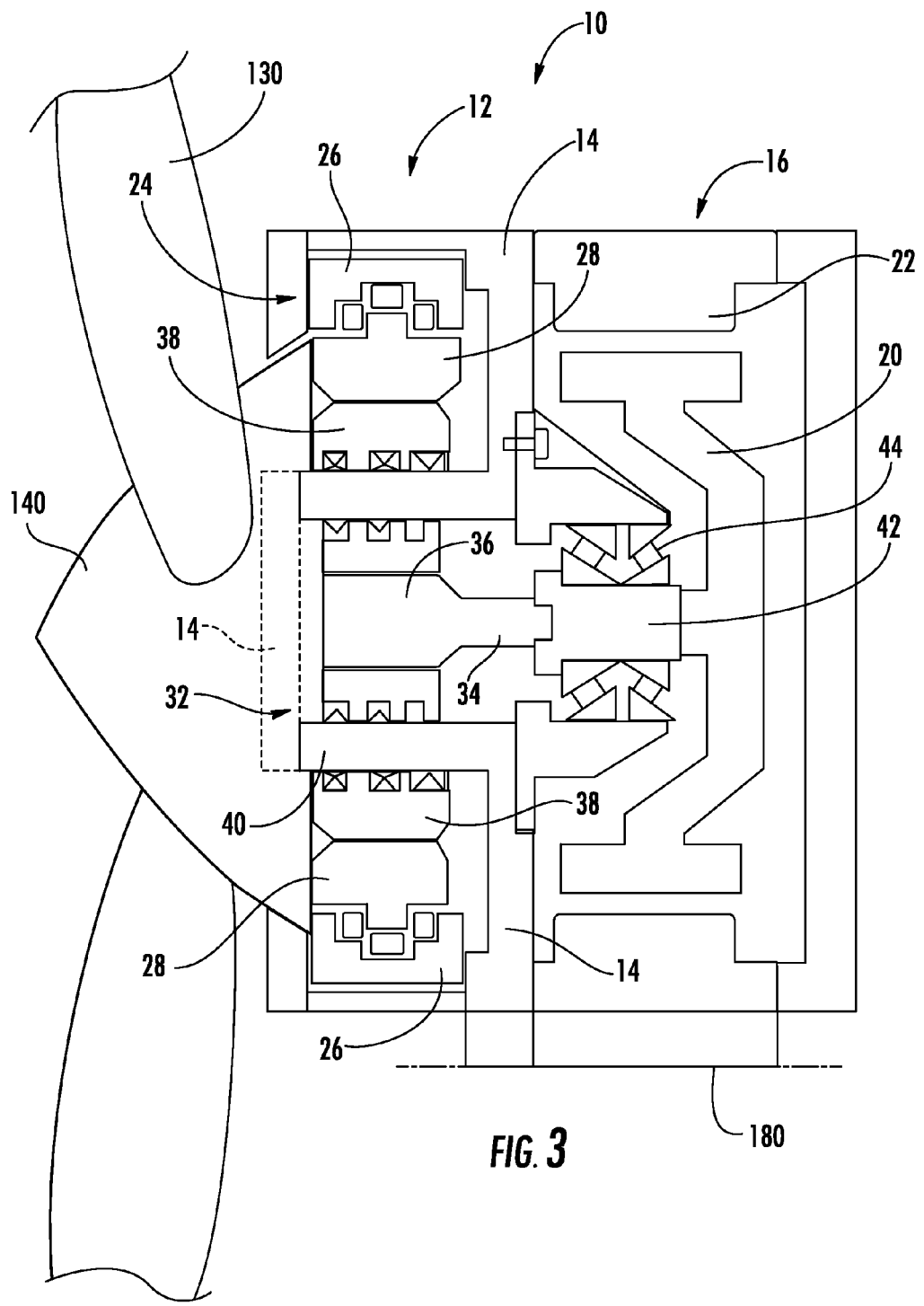
FIG. 3 is a cut-away view of an embodiment of a drive train that may be used in the wind turbine of FIG. 2.
Figure 4:
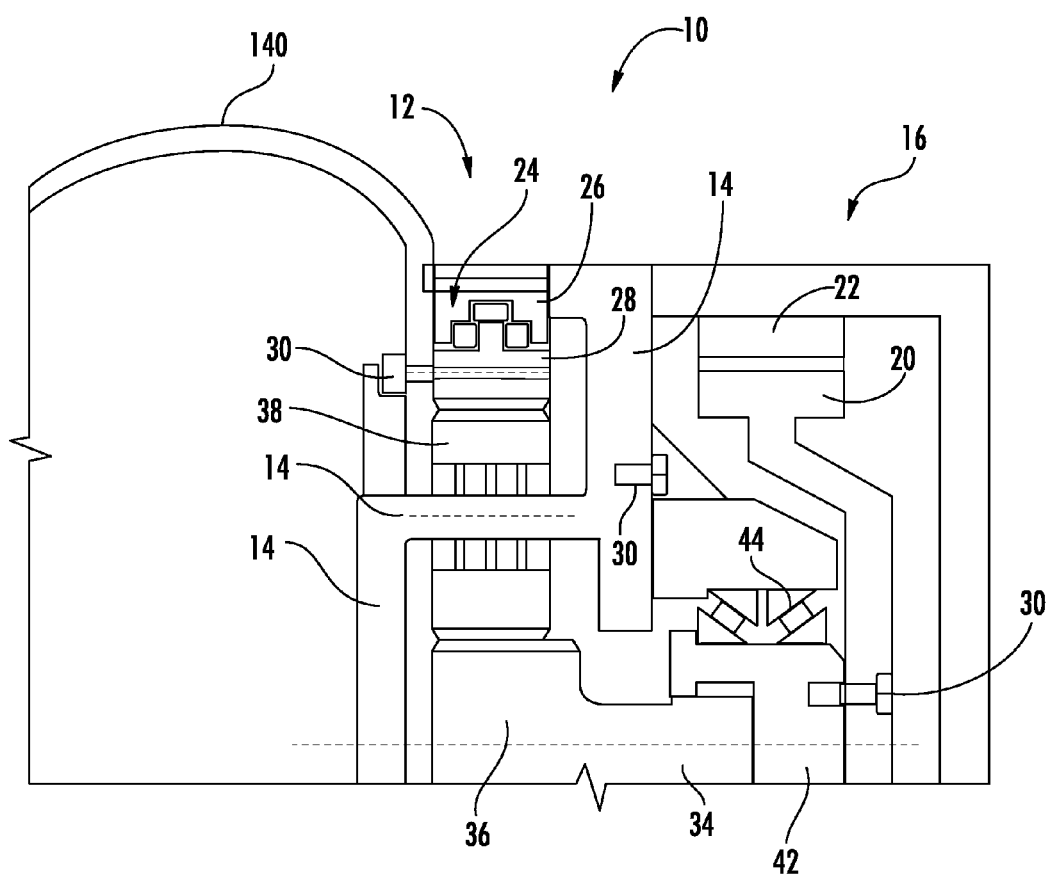
FIG. 4 is a more detailed cut-away view of an embodiment of a representative drive train.

Referring to FIGS. 3 and 4, in a particular embodiment of the single-stage drive train 10, the gearbox 12 includes an outer slewing bearing 24 that has a stationary ring 26 mounted to the fixed gear carrier 14, for example by way of bolts 30 as illustrated in FIG. 4, or any other suitable coupling mechanism. The slewing bearing 24 includes a rotating ring gear 28 that is coupled to the rotor 140, for example, by bolts 30 as illustrated in FIG. 4, or any other suitable coupling mechanism. The coupling between the ring gear 28 and hub 140 may include any manner of intermediate flange, or other coupling device. Thus, as can be readily appreciated from FIG. 4, the wind turbine rotor 140 is directly coupled to the gearing arrangement within the drive train 10 without an intermediate drive shaft.

The gearbox 12 may include any manner of suitable gearing arrangement. In the illustrated embodiments, the gearbox 12 includes a planetary gear configuration 32 between the rotating ring gear 28 and a gearbox output shaft 34. This planetary gear configuration 32 may include, for example, a plurality of planet gears 38 engaged with a rotating sun gear 36, which rotationally drives the output shaft 34. For example, the output shaft 34 may be configured as an integral component or separate axial extension of the sun gear 36, as particularly depicted in FIG. 3. In an alternative embodiment, the output shaft 34 may be a separately formed component that is mechanically coupled to the same gear 36 without an intermediate gearing arrangement.

The planet gears 38 may be supported on individual shafts 40 that are defined by portions of the fixed gear carrier 14 such that the weight of the planet gears 38 is borne directly by the fixed carrier 14, as particularly illustrated in FIG. 3.

Referring to FIG. 4, the generator 16 includes a stationary stator 22 that may be directly coupled to the fixed gear carrier 14 by way of bolts 30, or any other suitable coupling mechanism. The rotor 20 is rotationally coupled to the output shaft 34 of the gearbox 12 via any suitable coupling mechanism, such as a spline hub 42 depicted in the figures. The spline hub 42 may be directly coupled to the stator 20 via bolts 30, or any other suitable coupling mechanism. The spline hub 42 is rotationally supported by any suitable bearing mechanism 44 that may also be mounted to the gear carrier 14 concentric to the spline hub 42.

Referring to FIG. 3, the generator stator 22 may be mounted (and thus directly supported by) to the mainframe 180.

It should be appreciated that the exemplary drive train configuration 10 illustrated in the figures and discussed above is presented for exemplary purposes only. For example, the single-stage drive train configuration 10 may include any suitable gearing configuration that produces a desired gear ratio of between about 1.7:1 to about 11:1, and more particularly between about 4:1 to about 6:1.

It should be further appreciated that the present invention encompasses any manner of wind turbine 100 (FIG. 2) that utilizes a drive train configuration 10 in accordance with aspects of the invention as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A drive train for a wind turbine, said wind turbine comprising individual rotor blades connected to a rotor hub, said drive train comprising:
    a gearbox, said rotor hub mounted directly to said gearbox;
    said gearbox further comprising a stationary gear carrier mounted to a mainframe of said wind turbine, wherein said gearbox substantially supports the weight of said rotor hub; and
    a generator axially spaced from said gearbox, said generator comprising a rotor and stationary stator, said stationary gear carrier disposed axially forward of said stationary stator, said gearbox comprising an output shaft coupled to said rotor, wherein said gearbox substantially supports the weight of said rotor.

2. A drive train for a wind turbine, said wind turbine comprising individual rotor blades connected to a rotor hub, said drive train comprising:
    a gearbox, said rotor hub mounted directly to said gearbox;
    said gearbox further comprising a stationary gear carrier mounted to a mainframe of said wind turbine, wherein said gearbox substantially supports the weight of said rotor hub; and
    a generator, said generator comprising a rotor and stationary stator, said gearbox comprising an output shaft coupled to said rotor, wherein said gearbox substantially supports the weight of said rotor; and
    wherein said gearbox comprises an outer slowing bearing having a stationary ring mounted to said gear carrier and a rotating gear ring, said rotor hub mounted to said rotating gear ring.

3. The drive train as in claim 2, wherein said gearbox comprises a planetary gear configuration between said rotating gear ring and said output shaft.

4. The drive train as in claim 3, wherein said planetary gear configuration comprises a plurality of planet gears supported by said gear carrier and geared to said rotating gear ring, and a rotating sun gear geared to said planet gears, said sun gear rotationally driving said output shaft.

5. The drive train as in claim 4, wherein said output shaft comprises an axial extension of said sun gear.

6. The drive train as in claim 5, wherein said output shaft and said sun gear are formed as a single integral component.

7. The drive train as in claim 4, wherein said gear carrier defines a fixed shaft for each of said planet gears.

8. The drive train as in claim 1, further comprising a spline hub mounted to said rotor, said output shaft coupled to said spline hub for rotationally driving said rotor.

9. The drive train as in claim 8, further comprising a spline hub bearing mounted to said gear carrier concentric to said spline hub.

10. The drive train as in claim 1, wherein said stator is mounted to said mainframe.

11. The drive train as in claim 1, wherein said drive train has a gear ratio of between about 1.7:1 to about 11:1.

12. A wind turbine, comprising:
    a tower;
    a nacelle disposed atop said tower;
    a mainframe stationarily mounted within said nacelle;
    individual rotor blades connected to a rotor hub;
    a drive train disposed within said nacelle, said drive train comprising:
        a gearbox mounted directly to said rotor hub, said gearbox comprising an output shaft;
        said gearbox further comprising a stationary gear carrier mounted to said mainframe, wherein said gearbox substantially supports the weight of said rotor hub; and
        a generator axially spaced from said gearbox, said generator comprising a rotor and stationary stator, said stationary gear carrier disposed axially forward of said stationary stator, said output shaft coupled to said rotor, wherein said gearbox substantially supports the weight of said rotor.

13. The wind turbine as in claim 12, wherein said gearbox comprises an outer slewing bearing having a stationary ring mounted to said gear carrier and a rotating gear ring, said rotor hub mounted to said rotating gear ring.

14. The wind turbine as in claim 13, wherein said gearbox comprises a planetary gear configuration between said rotating gear ring and said output shaft, said planetary gear configuration comprising a plurality of planet gears supported by said gear carrier and geared to said rotating gear ring, and a rotating sun gear geared to said planet gears, said sun gear rotationally driving said output shaft.

15. The wind turbine as in claim 14, wherein said output shaft comprises an axial extension of said sun gear.

16. The wind turbine as in claim 14, wherein said gear carrier defines a fixed shaft for each of said planet gears.

17. The wind turbine as in claim 12, further comprising a spline hub mounted to said rotor, said output shaft coupled to said spline hub for rotationally driving said rotor, and further comprising a spline hub bearing mounted to said gear carrier concentric to said spline hub.

18. The wind turbine as in claim 12, wherein said stator is mounted to said mainframe.

* * * * *